(12) United States Patent
Hélot et al.

(10) Patent No.: US 10,696,161 B2
(45) Date of Patent: Jun. 30, 2020

(54) OPERATING KNOB EXTENDING FROM THE SURFACE OF A PIXEL-BASED SCREEN

(71) Applicant: AUDI AG, Ingolstadt (DE)

(72) Inventors: Jacques Hélot, Ingolstadt (DE); Joris Mertens, Ingolstadt (DE); Immo Redeker, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/470,066

(22) PCT Filed: Nov. 23, 2017

(86) PCT No.: PCT/EP2017/080212
§ 371 (c)(1),
(2) Date: Jun. 14, 2019

(87) PCT Pub. No.: WO2018/108480
PCT Pub. Date: Jun. 21, 2018

(65) Prior Publication Data
US 2020/0079218 A1    Mar. 12, 2020

(30) Foreign Application Priority Data
Dec. 16, 2016   (DE) .......................... 10 2016 225 232

(51) Int. Cl.
*B60K 35/00*    (2006.01)
*B60K 37/06*    (2006.01)
(Continued)

(52) U.S. Cl.
CPC .............. *B60K 35/00* (2013.01); *B60K 37/06* (2013.01); *G06F 3/0362* (2013.01);
(Continued)

(58) Field of Classification Search
CPC ................. G06F 3/0362; G06F 1/1652; B60K 2370/152; B60K 2370/1531; B60K 2370/145
See application file for complete search history.

(56) References Cited

U.S. PATENT DOCUMENTS 6,072,475 A    6/2000    Van Ketwich

FOREIGN PATENT DOCUMENTS

CN      205775388 U     12/2016
DE   10 2014 016 328 B3   3/2016
(Continued)

OTHER PUBLICATIONS

GLASSCAPE promotional package (in German); RAFI GmbH & Co KG (Apr. 16, 2012).*
(Continued)

*Primary Examiner* — Laurence J Lee
(74) *Attorney, Agent, or Firm* — Staas & Halsey LLP

(57) ABSTRACT

An operating knob for an operating apparatus extends away from a reference plane that delimits the operating knob on a rear side. The operating knob is in the form of a three-dimensionally protruding body in relation to the reference plane up to a knob height. The operating knob has at least one side wall extending between the reference plane and the knob height at an angle greater than 20° with respect to the reference plane as a placement surface for at least one finger operating the operating knob. Luminous outputs of at least one luminous segment or a pixel matrix are provided on the side wall.

14 Claims, 14 Drawing Sheets

(51) Int. Cl.
- *G06F 3/0362* (2013.01)
- *G06F 3/041* (2006.01)
- *G06F 3/0484* (2013.01)
- *G06F 3/0488* (2013.01)
- *G05G 1/01* (2008.04)
- *G05G 1/04* (2006.01)
- *G05G 1/08* (2006.01)
- *G05G 1/10* (2006.01)
- *G06F 3/01* (2006.01)

(52) U.S. Cl.
CPC ........ *G06F 3/0416* (2013.01); *G06F 3/04847* (2013.01); *G06F 3/04883* (2013.01); *B60K 2370/126* (2019.05); *B60K 2370/128* (2019.05); *B60K 2370/131* (2019.05); *B60K 2370/145* (2019.05); *B60K 2370/1442* (2019.05); *B60K 2370/152* (2019.05); *B60K 2370/158* (2019.05); *B60K 2370/1523* (2019.05); *B60K 2370/1531* (2019.05); *B60K 2370/1534* (2019.05); *B60K 2370/20* (2019.05); *B60K 2370/31* (2019.05); *B60K 2370/336* (2019.05); *B60K 2370/343* (2019.05); *B60K 2370/345* (2019.05); *G05G 1/01* (2013.01); *G05G 1/04* (2013.01); *G05G 1/08* (2013.01); *G05G 1/105* (2013.01); *G06F 3/016* (2013.01)

(56) References Cited

FOREIGN PATENT DOCUMENTS

| | | |
|---|---|---|
| DE | 10 2015 223 450 A1 | 11/2016 |
| EP | 2 251 762 A2 | 11/2010 |
| EP | 2 251 762 A3 | 11/2010 |
| WO | 03/05074 A1 | 6/2003 |

OTHER PUBLICATIONS

GLASSCAPE technical data sheet / promotional package (in English); RAFI GmbH & Co KG (2019).*
German Office Action dated Aug. 27, 2019 from German Patent Application No. 10 2016 225 232.1, 12 pages.
Translation of International Preliminary Report on Patentability dated Jun. 20, 2019 from International Patent Application No. PCT/EP2017/080212, 8 pages.
International Search Report dated Apr. 18, 2018 from International Patent Application No. PCT/EP2017/080212, 3 pages.
PCT/EP2017/080212, Nov. 23, 2017, Jacques Hélot et al., Audi AG.
10 2016 225 232.1, Dec. 16, 2016, Jacques Hélot et al., Audi AG.

* cited by examiner

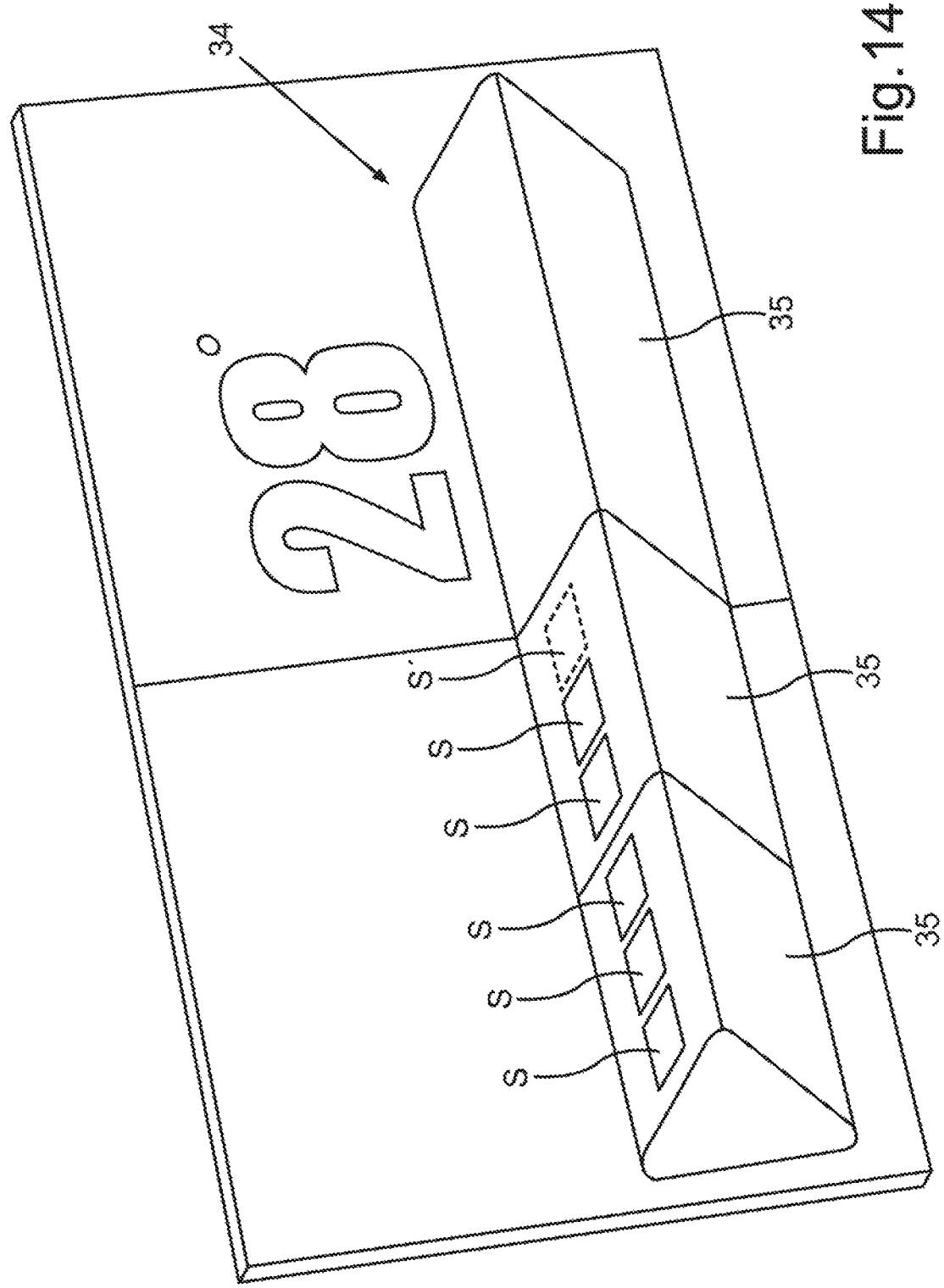

OPERATING KNOB EXTENDING FROM THE SURFACE OF A PIXEL-BASED SCREEN

CROSS REFERENCE TO RELATED APPLICATIONS

This application is a U.S. national stage of International Application No. PCT/EP2017/080212, filed on Nov. 23, 2017. The International Application claims the priority benefit of German Application No. 10 2016 225 232.1 filed on Dec. 16, 2016. Both the International Application and the German Application are incorporated by reference herein in their entirety.

BACKGROUND

Described herein is an operating apparatus having an operating knob. The operating knob can be embodied for example in the form of a rotary knob, as is known for example in a motor vehicle for setting a temperature or volume.

Operating knobs known from the related art can be provided, for example, as a rotary knob in the manner described for rotary regulation, or for example as a grip piece for sliding for a slide control or as a pad for placing the tip of a finger on a key. An operating knob consequently refers to a grip piece or a contact piece provided for capturing a rotary movement or sliding movement or push movement of a finger. Operating knobs are generally produced from a plastics body that may be coated with a rubber coating to improve the grip. In order to provide orientation relating to the current rotary position or generally the currently set parameter value to a user, markings can be printed on an operating knob. The visual markings, however, are permanent and matched to a single application of the operating knob, for example setting the volume or the temperature.

SUMMARY

Described herein is an operating knob in an operating apparatus which is universally utilizable.

Described herein is an operating apparatus having an operating knob, that is to say a knob or 3D operating element for being gripped or grasped with the fingers. The operating knob consequently extends as a three-dimensionally protruding body and has overall a knob height. The knob height is measured from a reference plane that can be imagined to be located at a rear side of the operating knob and delimits the operating knob to the rear side. The operating knob extends from the rear side to the knob height, which is where the front side of the operating knob is located. The operating knob has a side wall extending perpendicularly, or at least at an angle of greater than 20°, for example greater than 45°, between the reference plane and the knob height. The side wall serves in the known manner as a placement surface for at least one finger with which a user can grip or touch the operating knob. The knob height to this end is for example greater than 2 mm, for example greater than 0.5 cm or greater than 1 cm, to ensure a structure that is able at least to be felt with fingertips, for example a grippable or claspable knob or button. According to the disclosure, the side wall has a plurality of luminous outputs of at least one luminous segment or a pixel matrix. A luminous segment can represent a luminous shape by virtue of the luminous segment emitting light in the switched-on state. The luminous shape of the luminous segment here represents a finished, self-luminous symbol that is to be presented on the side wall. The luminous shape of a luminous segment is consequently constant and not controllable. A pixel matrix, on the other hand, is an arrangement or system of a plurality of luminous pixels that can be actuated individually, independently from one another, with the result that a luminous shape can be defined by actuating some of the luminous pixels. The shape of the luminous shape or the self-luminous symbol is thus settable. The luminous outputs in each case represent an exit region for the light of a luminous segment or the pixel matrix out of the operating knob. The operating knob can be embodied for example cylindrically or frustoconically. The lateral surface of the cylinder or of the truncated cone then represents the side wall. It is then possible for a luminous shape or a self-luminous symbol or pattern to be displayed or output or presented on the side wall by using a luminous segment or a pixel pattern.

The examples described herein offer the advantage that an appearance of the operating knob can be set by switching the at least one luminous segment or luminous pixels of the pixel matrix on and off.

Also part of the disclosure are optional developments, the features of which offer additional advantages.

For example, a pixel matrix is provided, and the pixel matrix is set up to present pixel patterns that are specifiable by pixel data on the side wall. It is possible in this way for example for an animated or temporally variable self-luminous luminous shape or a corresponding symbol to be presented.

The operating knob can be provided or embodied as a single part for installation in an operating device, for example in a motor vehicle. However, according to one development, the reference plane at the rear side of the operating knob is formed by an external surface of a pixel-based screen surrounding the operating knob. In other words, the operating knob is placed on or integrated in a screen. The operating knob is consequently surrounded by the pixel matrix of the screen. This offers the resulting advantage that a contiguous, consistent pixel graphic can be presented that extends from the side wall to the screen. For example, orientation lines or orientation symbols extending from the side wall to the presentation region of the screen can be presented.

According to an example embodiment, the screen and the operating knob that is arranged thereon are embodied in one piece. To this end, the external surface of the screen may be provided on the basis of a panel, for example a glass panel or a plastic panel, and the side wall of the operating knob is likewise also provided on the basis of the panel by virtue of the panel having in the region of the operating knob a protrusion that forms or represents the operating knob. The panel thus has a protrusion that can be clasped by fingers. For example, the panel can be made to have a protrusion by way of deep drawing in the manner such that the 3D shape of the operating knob extends or projects above the plane of the pixel-based screen. The electronic pixel matrix of the screen itself can, in addition to the panel itself, likewise have a protrusion, such that a pixel graphic with the pixel pattern can thus be presented easily by using the pixel matrix of the screen in the region of the side wall and the pixel pattern is formed here directly on the side wall. A suitable pixel matrix having luminous pixels can be provided for example based on OLED (organic light-emitting diode) technology or TFT (thin-film transistor) technology.

While it is possible to realize the protrusion in a panel in a technically reliable fashion, problems may occur in the corresponding process of forming a protrusion of a pixel matrix, depending on the technology used for the luminous pixels of the pixel matrix. For this reason, according to one development, the luminous pixels of the screen are not included in the protrusion, but the luminous pixels of the screen are arranged in a pixel plane parallel to the reference plane. In other words, a protrusion is formed only in the panel and not the pixel matrix. The key here is that light of each individual luminous pixel is guided from the pixel to the luminous outputs of the side wall of the operating knob, than to the luminous outputs. To this end, a respective luminous output of the operating knob, that is to say in each case one, is optically coupled with in each case at least one of the luminous pixels via a light-guiding element, for example an optical fiber. It is thus possible to guide light of a luminous pixel to a luminous output using a light-guiding element. This is effected for example by way of total internal reflection, as is known from optical fibers. In other words, a bundle of light-guiding elements is arranged in the protrusion in the panel. Consequently, a standard pixel matrix is utilizable to also apply the pixel pattern onto the side wall that is arranged at an angle.

However, the at least one luminous segment or the pixel matrix may be curved into the body or forms an outer face of the side wall. In other words, the body can be made for example from a transparent glass or plastic in the form of a curved panel or a hollow shape and the at least one luminous segment or the pixel matrix can be arranged on an internal wall of the body. The at least one luminous segment or the pixel matrix can also be arranged on the outside. The two variants avoid optical distortions of a luminous pattern or pixel pattern on the side wall.

So far, only the side wall of the operating knob has been described. A frontal display face with further luminous outputs of at least one further luminous segment or the pixel matrix may be provided on the front side, that is to say parallel to the reference plane on a front side of the operating knob opposite the rear side. Consequently, this display face is a parallel plane that is offset with respect to the reference plane by the knob height and in which luminous outputs are likewise arranged. Consequently, offset with respect to the screen described, a screen that is smaller compared thereto is provided as the display face on the front side of the operating knob. In this way, it is possible to likewise output or present a display face or a display content that is settable by using pixel data on the front side of the operating knob.

As a further feature, the operating knob can have a touch-sensitive and/or proximity-sensitive surface on the side wall for capturing a rotary movement (rotary knob) and/or sliding movement (slide control) and/or push movement (key) of at least one finger operating the operating knob. It should be noted that the rotary movement relates for example to the at least one finger, while the operating knob itself can remain unmoved. The sensitive surface can be formed in a manner known per se by way of a sensor field, that is to say a touchpad sensor matrix. For example, capacitive proximity sensors for providing the sensitive surface can be provided, as is known in a touchscreen. The described frontal display face can also have a touch-sensitive design.

A control device of the operating apparatus can be set up to capture a sliding movement of the at least one finger on the side wall by way of the touch-sensitive and/or proximity-sensitive surface. In other words, a sliding movement, as occurs when the at least one finger swipes across or slides along the side wall, is thus identified by the control device by way of the touch-sensitive and/or proximity-sensitive surface, that is to say by way of the sensor field thereof. In dependence on the sliding movement, a distance value is ascertained that describes a displacement movement or rotary movement of the at least one finger relative to the side wall. In other words, it is ascertained how far the sliding movement along the side wall extended. In dependence on the distance value, it is then possible for example to displace the pixel pattern on the side wall by the distance value. In other words, the pixel pattern follows the sliding movement of the finger. In connection with a ring, it is thereby for example possible to optically simulate the rotation even in the case of a rigid ring.

The operating knob does not necessarily have to be cylindrical or frustoconical or cuboid. According to one development, the operating knob is embodied in the form of a ring. The side wall thus has two portions, specifically an outer portion of the outer ring wall and an inner portion of the inner ring wall of the ring. A circle between the outer ring wall and the inner ring wall can then be present as a frontal display face on the front side. A ring has the advantage that it is possible by way of a touch-sensitive and/or proximity-sensitive surface of the side wall to distinguish between a touch of the outer ring wall and on the inner ring wall. For example, a rotary movement and/or sliding movement and/or push movement can be captured at two different portions of the side wall by using an operating knob, and consequently two different functions can be controlled.

As an alternative to the embodiment in the form of a ring, the operating knob can be embodied as a key bar. Key bar is understood to mean that the touch-sensitive and/or proximity-sensitive surface of the side wall is divided into a plurality of touchpads or keys. It is consequently likewise possible to simultaneously realize the operation of several functions using a single operating knob. Instead of a bar having a plurality of keys, a bar for a slider can also be provided.

To increase the selection of operable functions to more than two, the following can be done. To this end, the control device is additionally set up to capture the sliding movement in a setting region of the side wall, for example the described inner ring wall or a side of the key bar. In other words, the distance value is then set here. To this end, a further sliding movement may be captured in a selection region of the side wall that differs from the setting region. This can be effected for example on the outer ring side or outer ring wall or on the key bar, across all keys. In dependence on this sliding movement in the selection region, one operating function out of several is selected or activated. In other words, the user selects, by way of a sliding movement in the selection region, the operating function that he or she wishes to set or control using the operating knob. In dependence on the sliding movement in the setting region, the distance value is then set as the setting value for the activated operating function.

One problem when using a three-dimensionally shaped touchscreen can be the lack of haptics, such as for example the absence of a click by which the user can tell using fingers whether the operating knob has successfully been operated. According to one development, the control device is therefore set up to control, in dependence on at least one captured sliding movement, a haptics actuator of the operating apparatus to agitate the operating knob. This agitation can be a jolt or a vibration. Here the user feels in the at least one finger, without looking, whether an operating input has been successful.

The operating apparatus described herein can be provided for example in a motor vehicle. The disclosure correspondingly also includes a motor vehicle having the operating apparatus described herein. The motor vehicle may be embodied in the form of a motorized vehicle, for example a passenger car or truck.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 14 is a schematic illustration of a perspective view of an operating knob that has luminous segments and is embodied in the form of a key bar.

DETAILED DESCRIPTION

Figure 1:
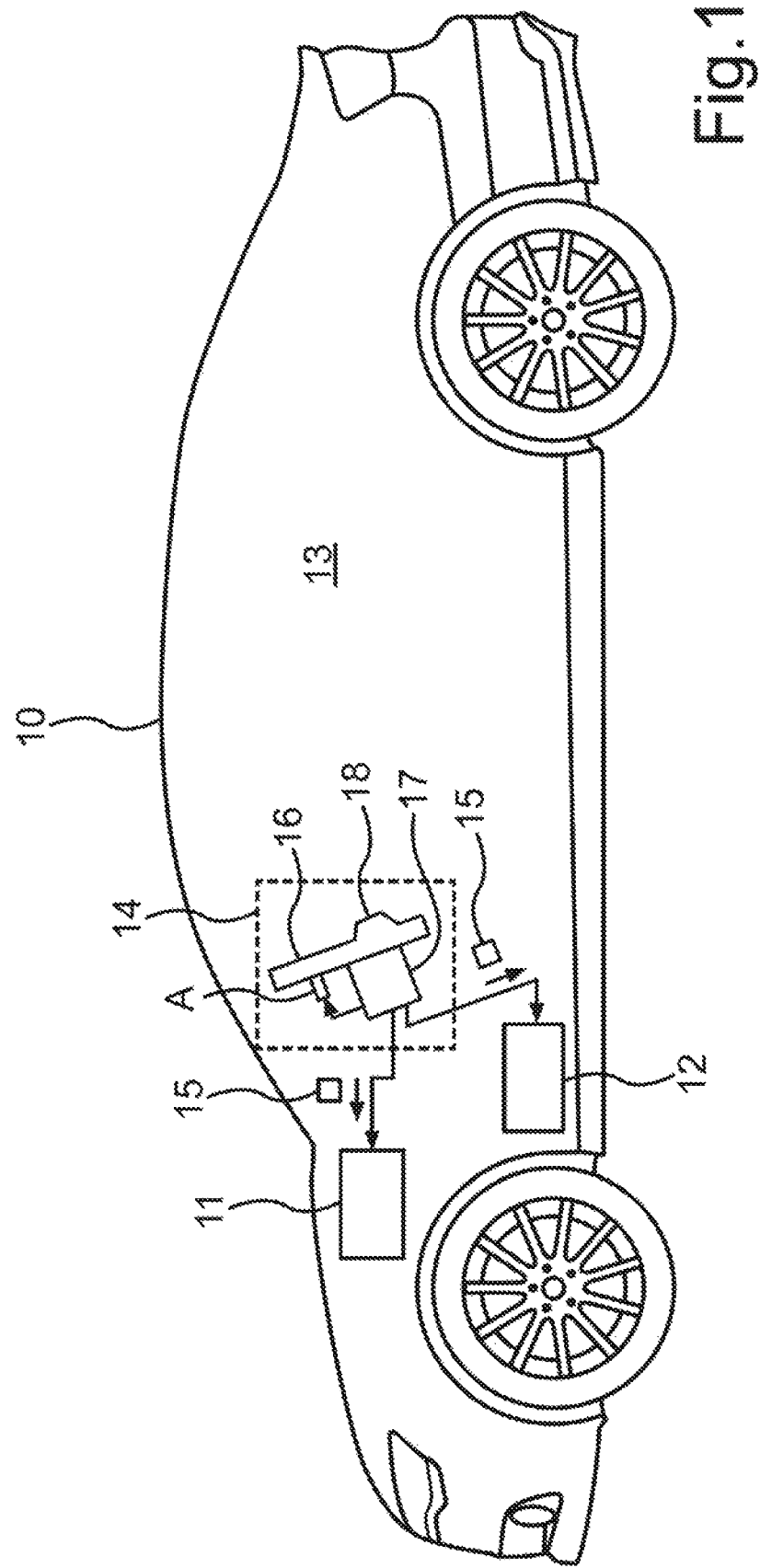
FIG. 1 is a schematic illustration of an embodiment of the motor vehicle according to the disclosure.

Reference will now be made to examples which are illustrated in the accompanying drawings.

The exemplary embodiments discussed below are example embodiments. In the exemplary embodiments, the described components of the embodiments each constitute individual features that are to be considered independently of one another, and which each also mutually independently refine the disclosure and are thus also to be regarded as constituent parts individually or in any combination other than that presented. Furthermore, the described embodiments may also be supplemented by further features that have already been described.

In the drawings, elements of identical function are denoted in each case with the same reference signs.

FIG. 1 shows a motor vehicle 10, which may be a motorized vehicle, for example a passenger car or truck. The motor vehicle 10 can have one or more vehicle components 11, 12 that a user of the motor vehicle 10 can operate from a vehicle interior 13 by using an operating apparatus 14. One vehicle component 11 can be, for example, an air conditioning system for the interior 13. A further vehicle component 12 can be, for example, a ventilation and/or a motorized seat system. Using the operating apparatus 14, the user can produce control signals 15 for controlling the vehicle components 11. To this end, the operating apparatus 14 can have a touchscreen 16 on which the user can effect an operating input. The operating input can be captured by a control apparatus 17 of the operating apparatus 14 by way of the touchscreen 16. In dependence on the captured operating input, the control apparatus 17 can produce the control signals 15.

However, in the case of the operating apparatus 14, the user does not simply have to perform the operation on a flat touchscreen 16. Rather, an operating knob 18 is made available to the user in the region of the touchscreen 16, and the user can grasp the operating knob 18 with his or her fingers, such that a three-dimensional integrated operating element, for example a rotary regulator or rocker arm, is provided on the touchscreen 16.

Figure 2:
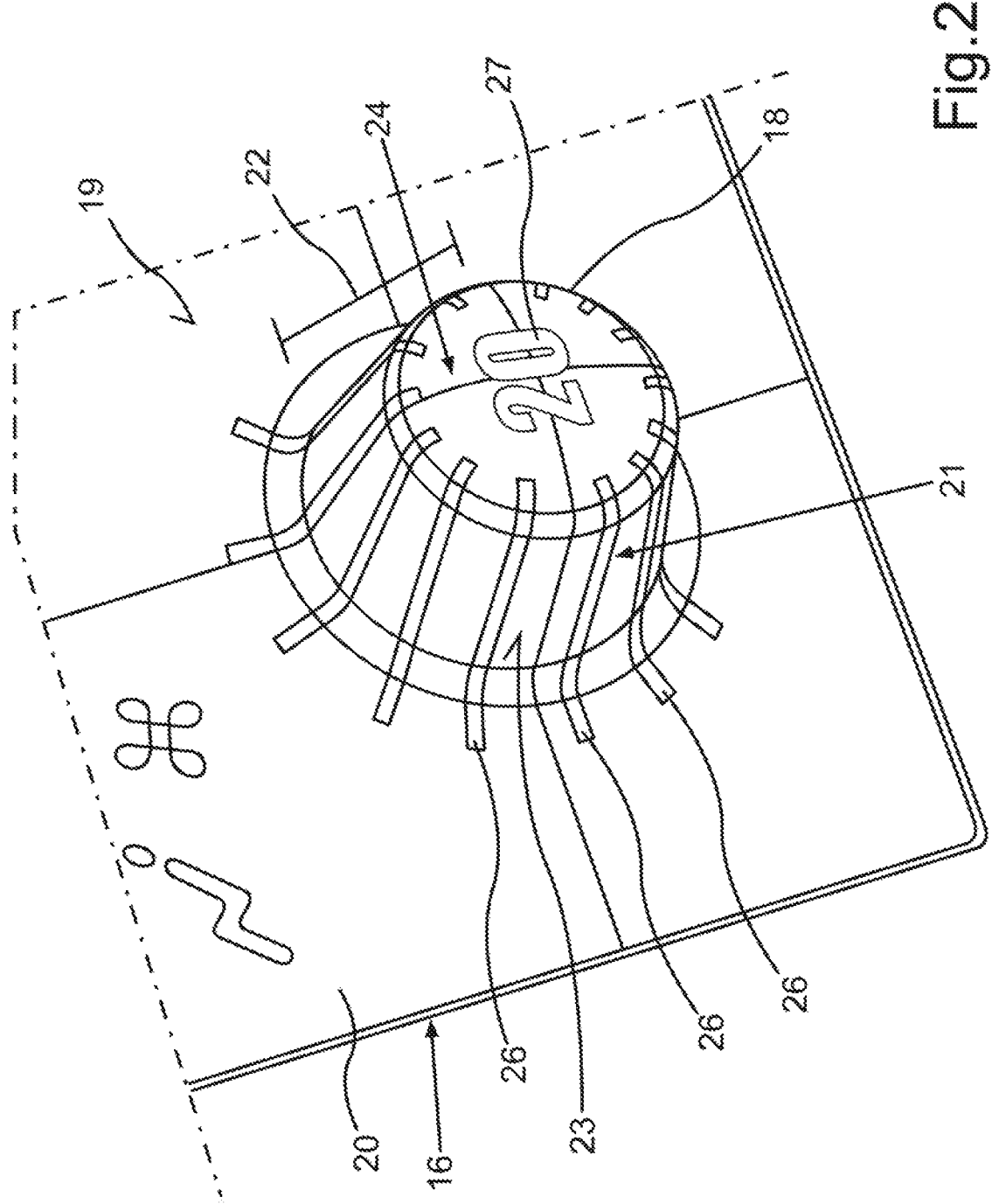
FIG. 2 is a schematic illustration of a perspective view of an operating knob of an operating apparatus of the motor vehicle of FIG. 1.

FIG. 2 illustrates one possible embodiment of such an operating knob 18. Starting from a reference plane 19, formed by a transparent panel 20 of the touchscreen 16, a body 21 of the operating knob 18 rises up above the reference plane 19 into the vehicle interior 13 up to a knob height 22. The body 21 therefore has a side wall 23 and a front side 24 at the distance of the knob height 22, parallel to the reference plane 19. An inclination of the side wall 23 relative to a surface normal N of the panel 16 has an angle W, which for example ranges from 0° to 70°, or for example ranges from 0° to 45°.

In the case of the operating apparatus 14, it is then possible for example by way of the control apparatus 17 to likewise display in each case a pixel graphic not only on the touchscreen 16 itself, but also on the side wall 23 and optionally on the front side 24. The pixel graphic can be configured contiguously or consistently with that in the display content on the touchscreen 16 itself. FIG. 2 shows by way of example how a pixel pattern 26 in the form of orientation marks or symbols or stripes on the side wall 23 can visualize a current virtual "rotary position" of the operating knob 18. A currently set setting value 27, for example, can be displayed on the front side 24.

Figure 3:
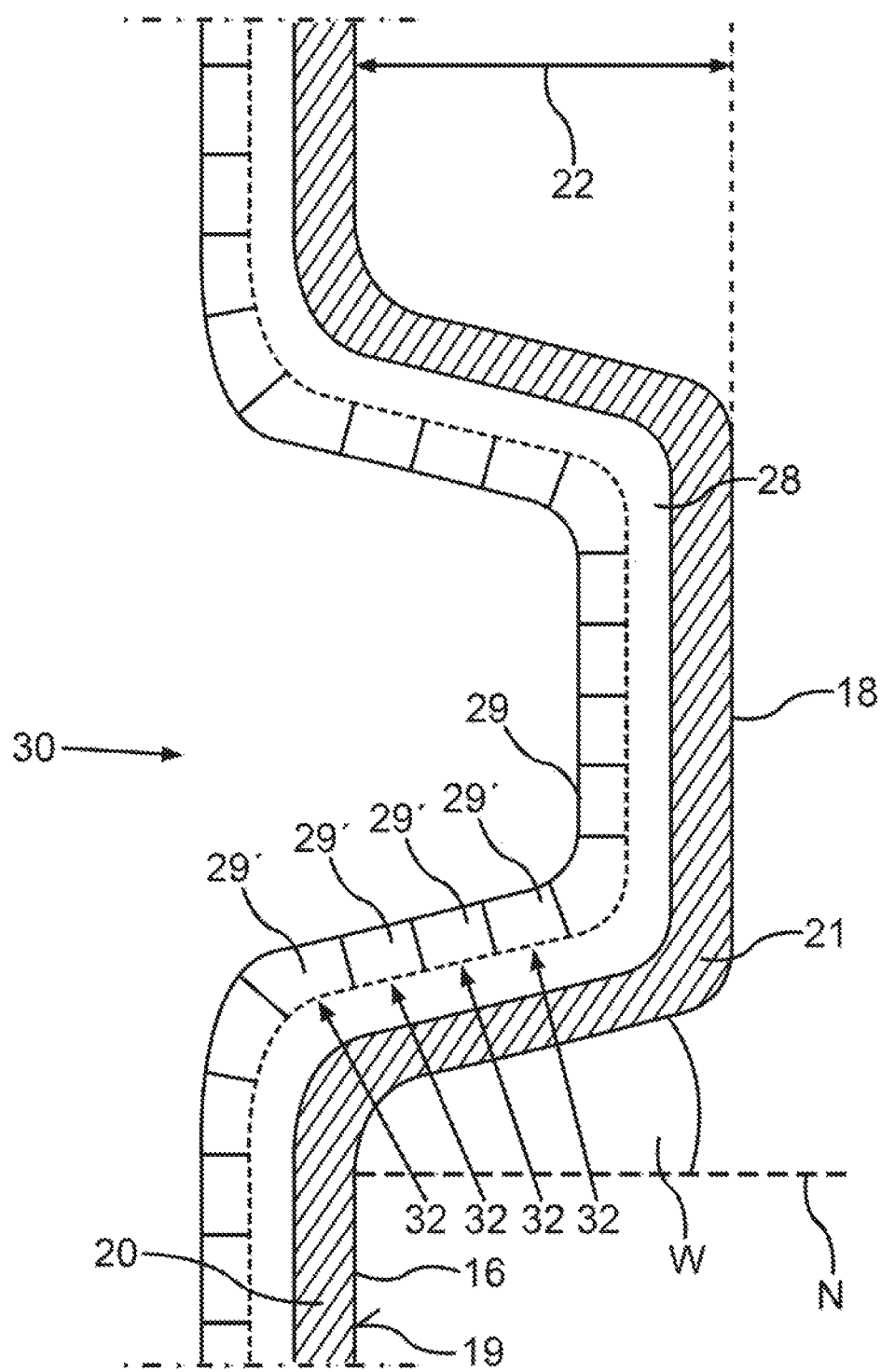
FIG. 3 is a schematic illustration of a sectional view of the operating knob of FIG. 2.

FIG. 3 illustrates how the knob 18 can be provided in the panel 20 of the touchscreen 16. The panel 20 can have the shape of the operating knob 18 for example by way of deep drawing. It is also possible for example for a sensor matrix 28 and for example a pixel matrix 29 with individually actuable luminous pixels 29' to be shaped or have a protrusion 30 together with the panel 20. For the sake of clarity, only some luminous pixels 29' have been denoted with a reference sign. The individual pixel outputs 32 of the luminous pixels 29' can be optically differentiable through the panel 20.

Figure 4:
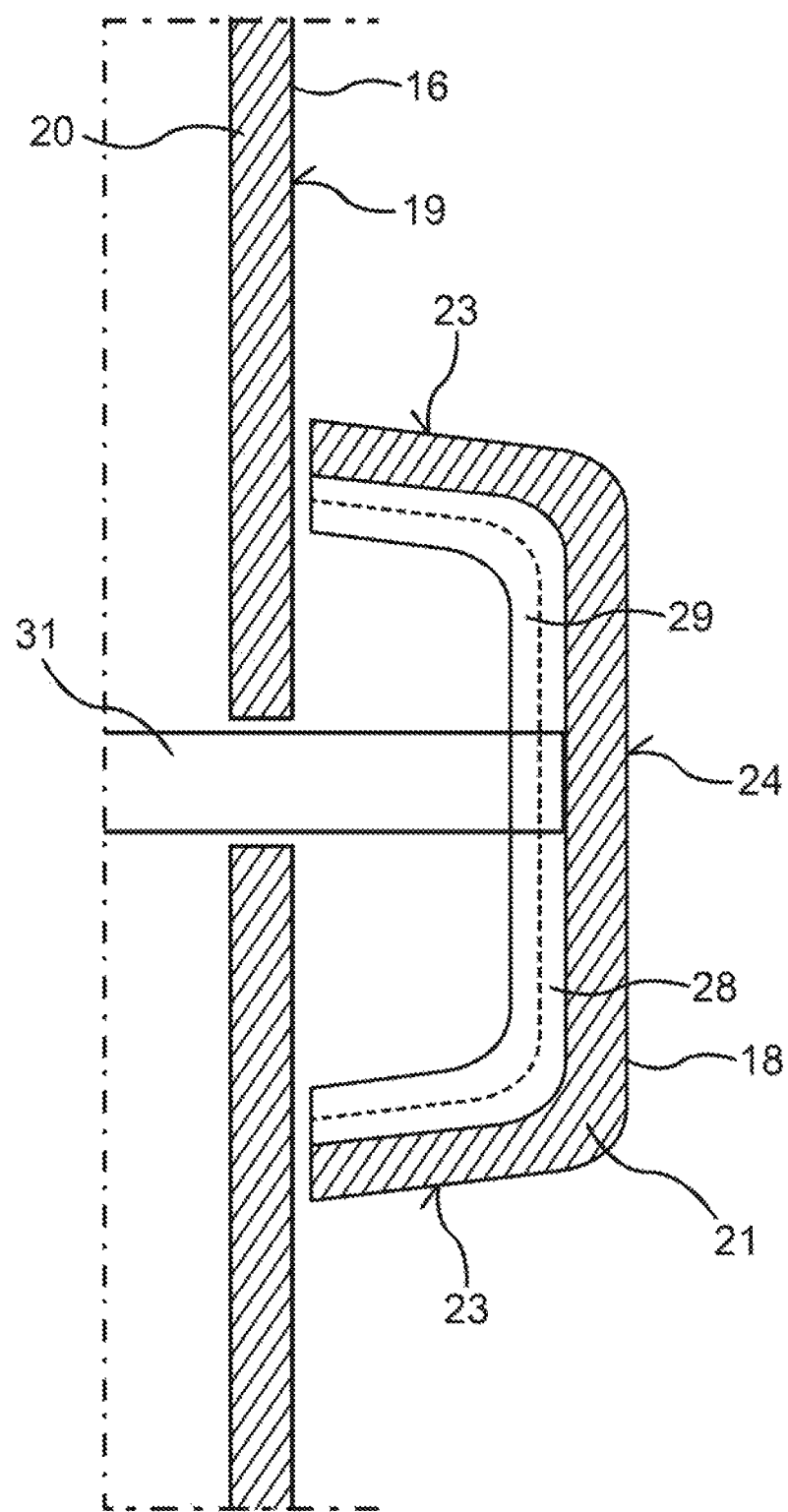
FIG. 4 is a schematic illustration of a sectional view of an alternative embodiment of the operating knob.

FIG. 4 illustrates an embodiment in which the operating knob 18 can be integrated as a separate component in the touchscreen 16. Here, a mechanically movable mount 31, for example by way of a rod or an axle, makes possible a relative movement of the operating knob 18 in relation to the touchscreen 16. A pixel matrix 29 can be provided in the operating knob 18. The touch sensor system 28 can be dispensed with for example in this embodiment.

Figure 5:
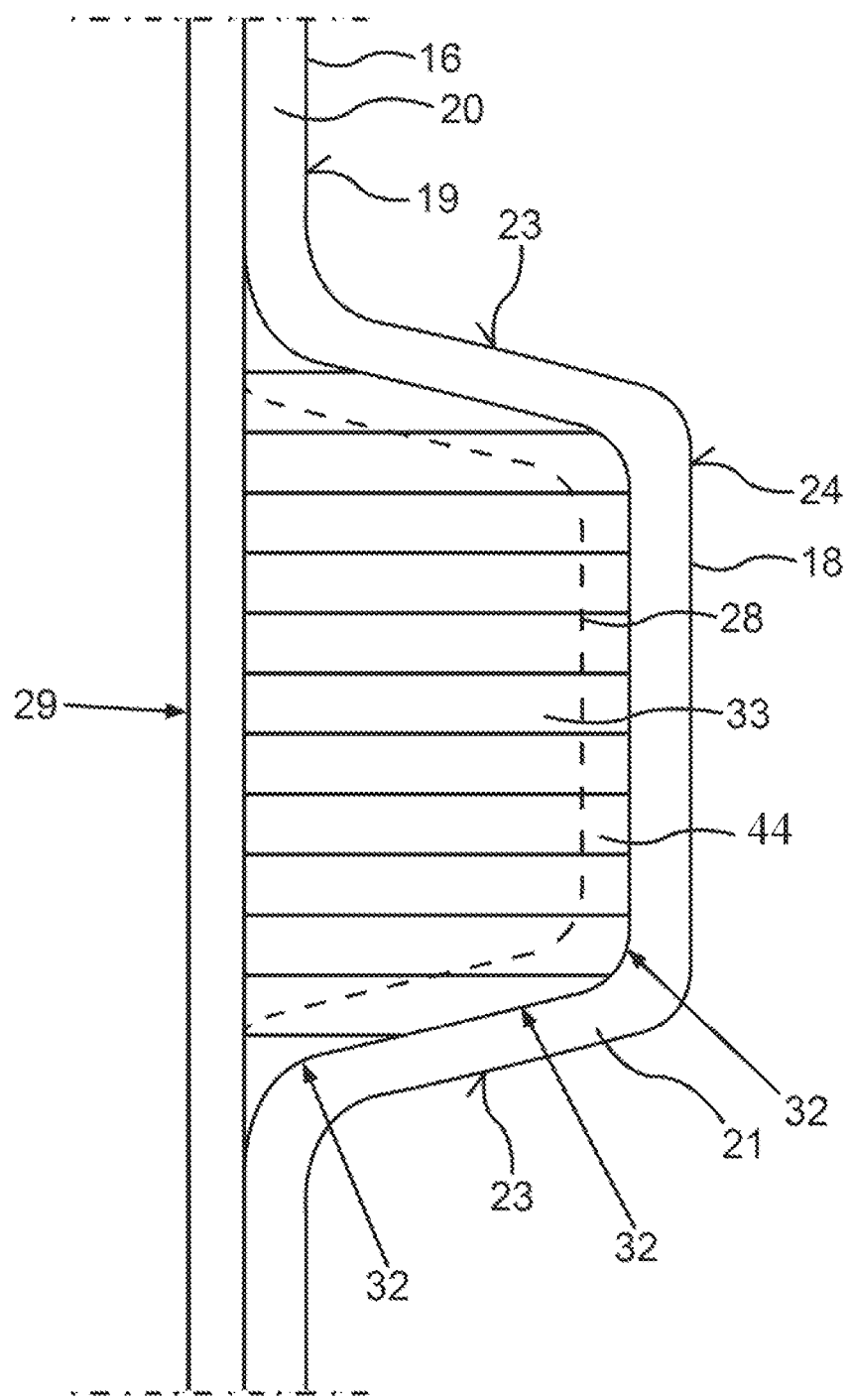
FIG. 5 is a schematic illustration of a sectional view of a further alternative embodiment of the operating knob.

FIG. 5 illustrates how only the panel 20 needs to be bent or curved to provide the operating knob 18. The pixel matrix 29 can be flat, parallel to the reference plane 19. So as to be able to guide the light from individual luminous pixels between individual luminous pixels of the pixel matrix 29 and pixel outputs 32 of the operating knob 18, light-guiding elements 33, for example optical fibers, are arranged in a cavity 44 between the panel 20 and the pixel matrix 29 inside the knob 18, with the alignment of the light-guiding elements guiding the light of individual luminous pixels of the pixel matrix 29 to the pixel outputs 32.

The touchscreen 16 can likewise have a curved surface outside the region of the operating knob 18. The reference plane 19 in that case represents an imaginary tangential plane of the panel in the region of the operating knob 18.

Figure 6:
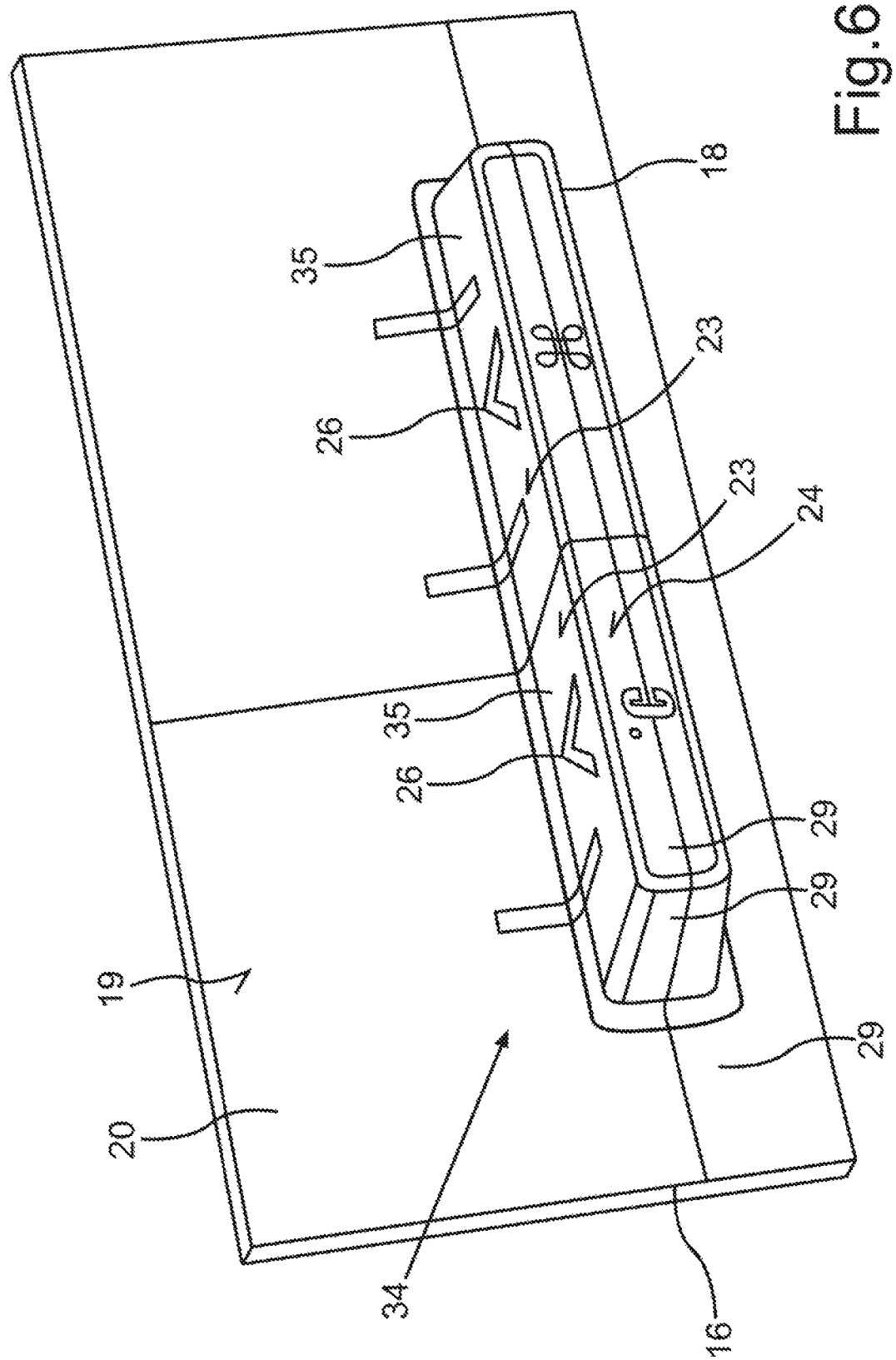
FIG. 6 is a schematic illustration of a perspective view of an embodiment of the operating knob as a key bar.

FIG. 6 illustrates how, as an alternative to a rotary knob, a key bar 34 can be provided as the operating knob 18. The key bar 34 can simulate rocker arms with individual, independent keys 35. Due to the fact that the pixel matrix 29 also extends over the side wall 23, it is possible to display changing or interchangeable symbols as individual pixel patterns 26 on the side wall.

Figure 7:
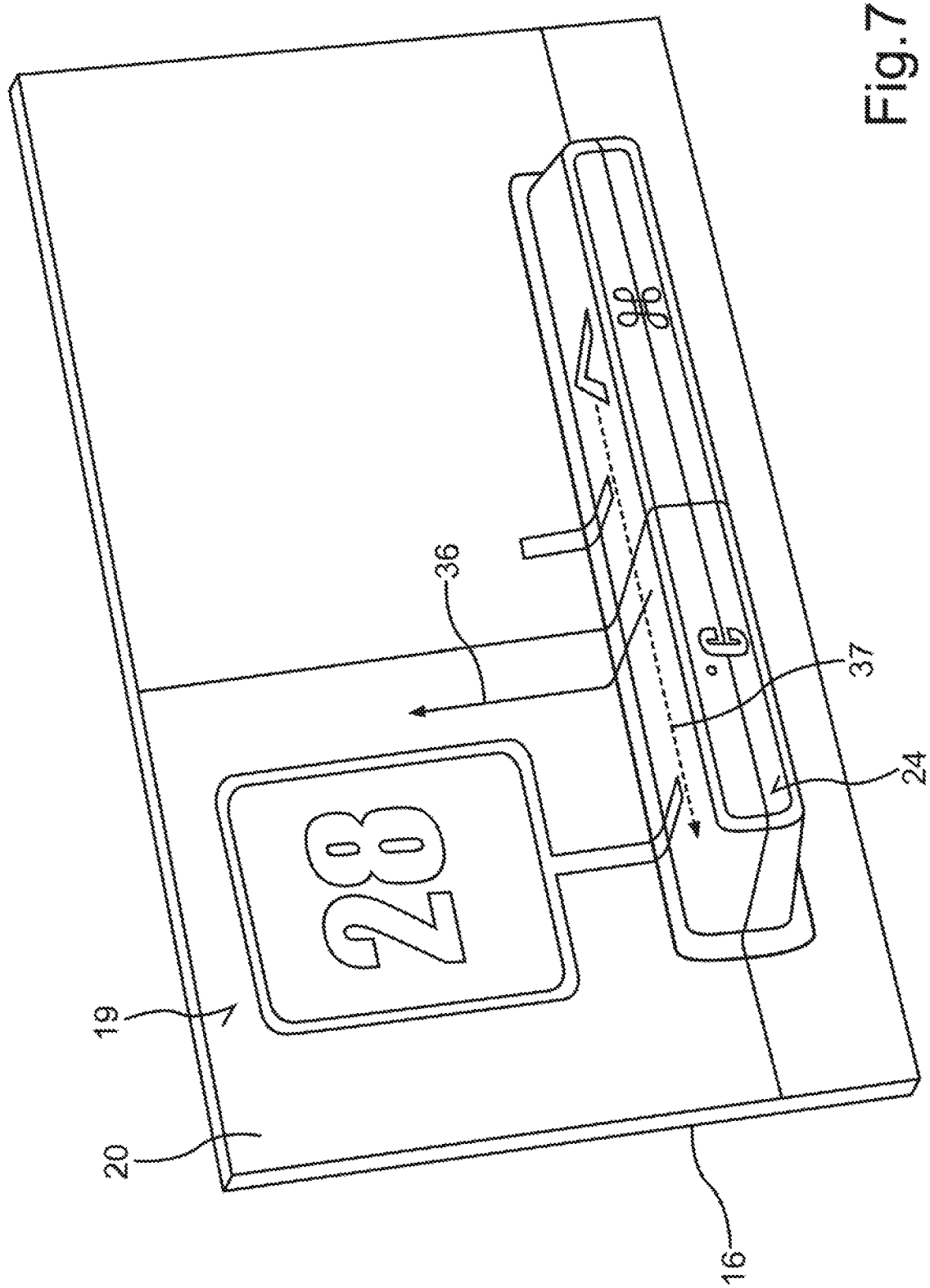
FIG. 7 is a schematic illustration of a perspective view of the key bar of FIG. 6 as it is being operated.

FIG. 7 illustrates how it can additionally be ensured that, upon touching a key 35 (in FIG. 7, this is the left key as an example), an animation 36 is provided through which the selected function can be activated. It is also possible to provide more operating functions than keys 35 between which the user can select using a swiping movement or sliding movement 37 (also known as a carousel). In this way it is possible, in the case of two keys 35, as illustrated in FIG. 6 and FIG. 7, to select more than two operating functions.

Figure 8:
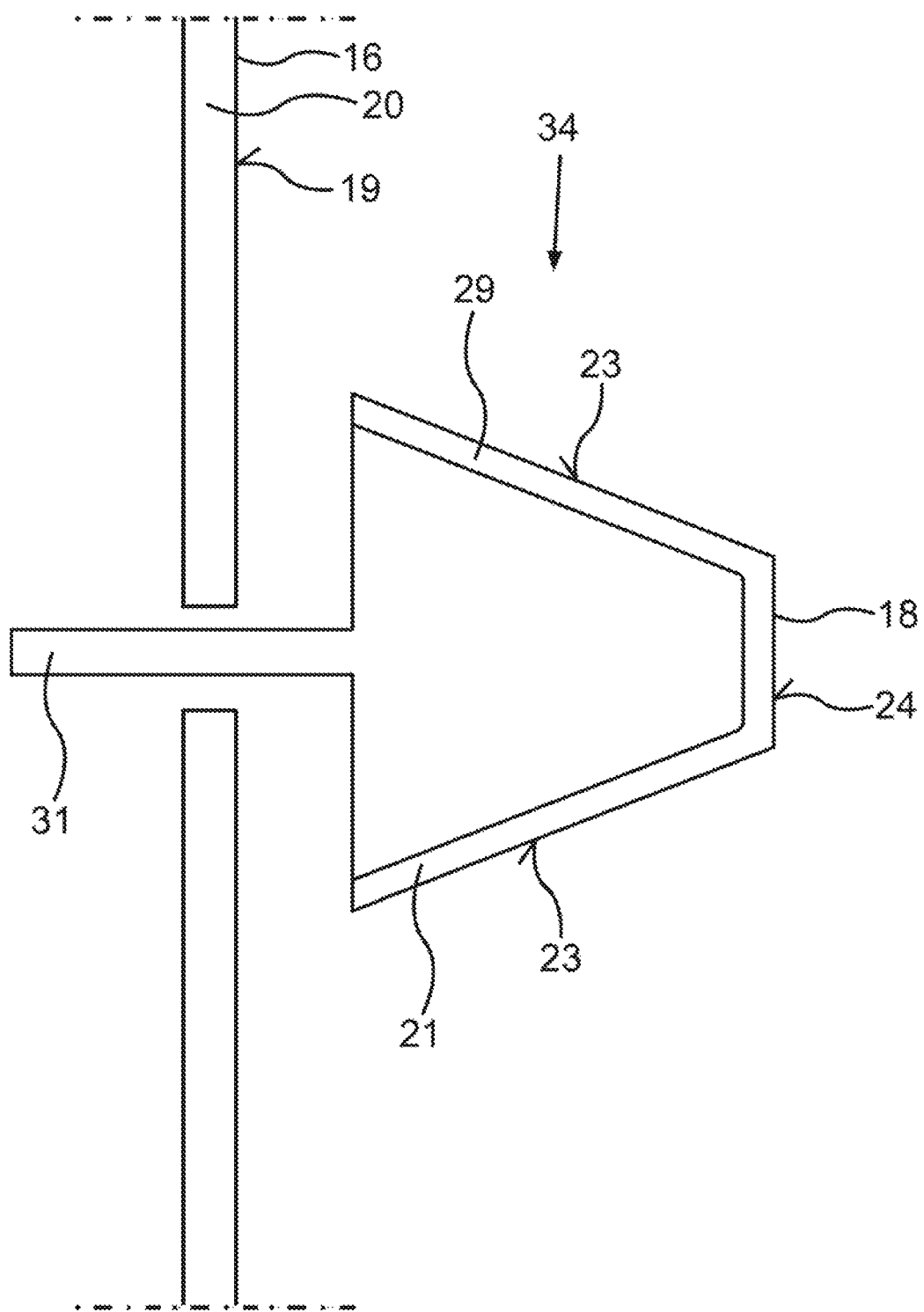
FIG. 8 is a schematic illustration of a sectional view of an alternative embodiment of the key bar.

FIG. 8 illustrates how the key bar 34 can also be embodied such that it is movable by virtue of (similar as in the case of the operating knob of FIG. 4) the key bar 34 also being mounted so as to be mechanically movable on an axle or rod as a mount 31. A tilting movement or lever movement is then provided for the key bar 34.

Figure 9:
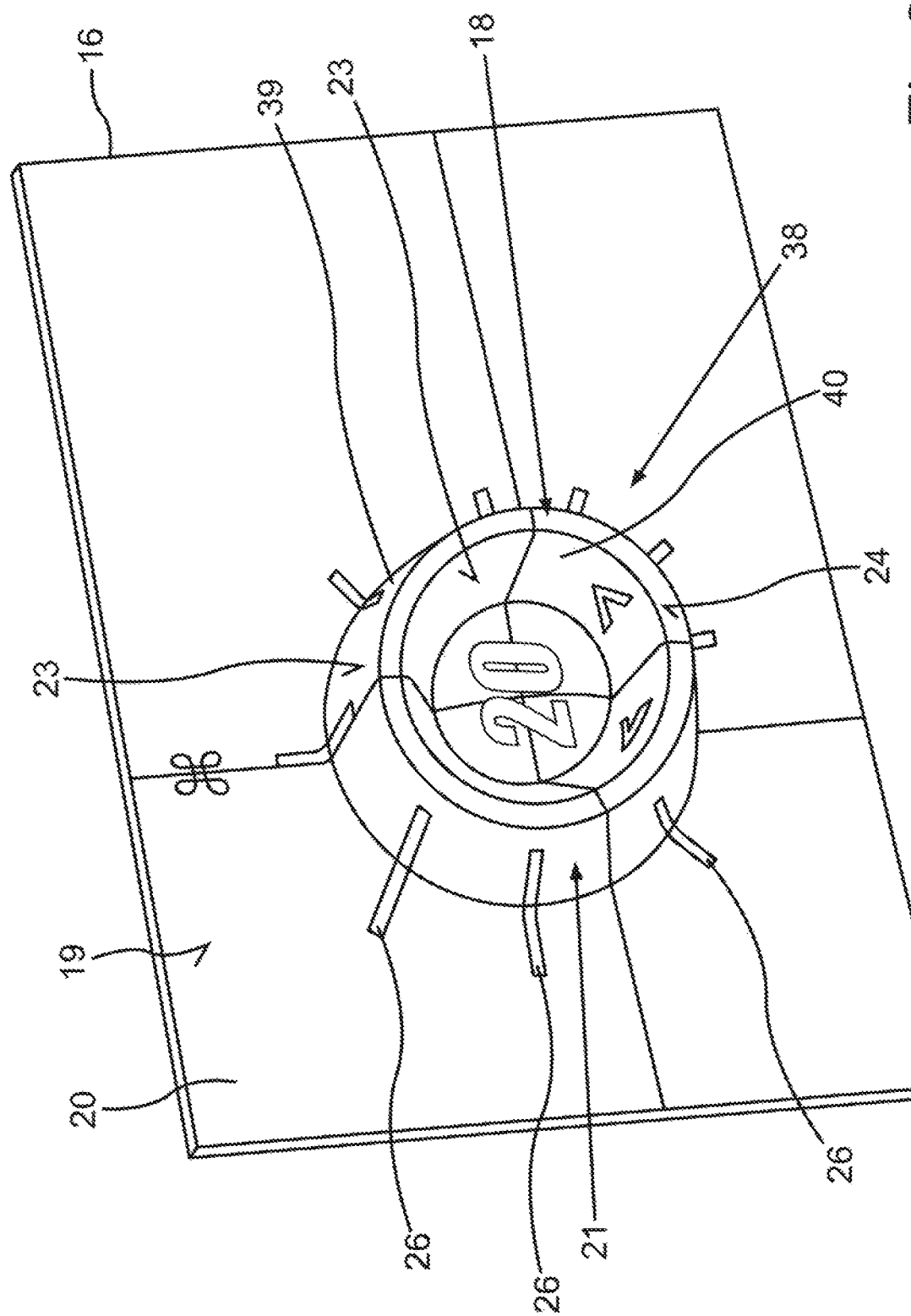
FIG. 9 is a schematic illustration of a perspective view of an embodiment of the operating knob as a ring.

FIG. 9 illustrates how the operating knob 18 can be embodied in the form of a ring 38. This results in a side wall 23 with an outer ring wall 39 and an inner ring wall 40.

Figure 10:
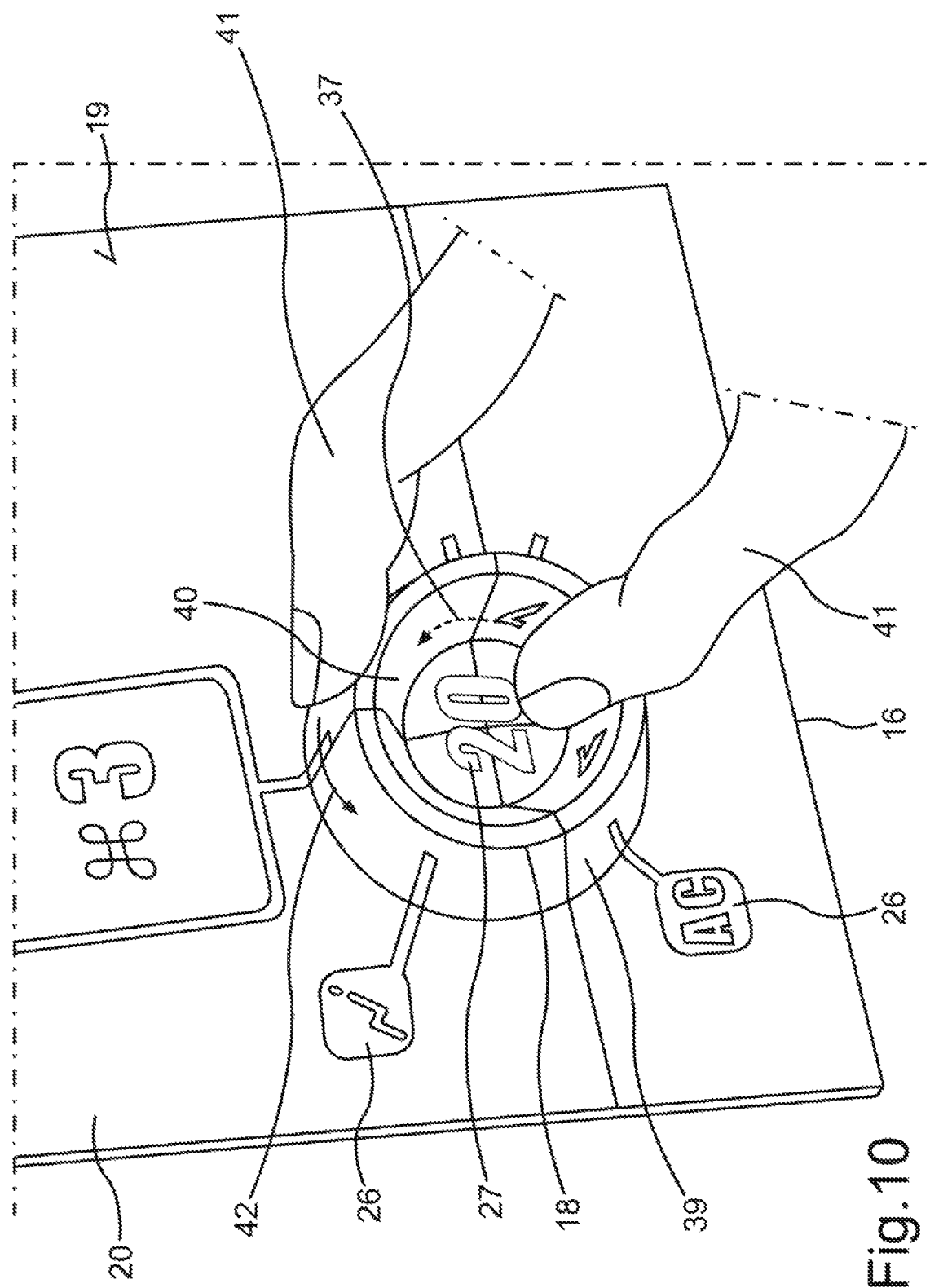
FIG. 10 is a schematic illustration of a perspective view of the ring of FIG. 9 as it is being operated.

FIG. 10 illustrates how the user can hereby use a finger 41 on the outer ring wall 39 to perform a sliding movement 42, hereby selecting the function to be set, and then uses the finger 41 on the inner ring wall 40 to change or set a setting value 27 of the selected function. The outer ring wall 39 here represents a selection region, and the inner ring wall 40 represents a setting region.

As an alternative, it is also possible in the case of the ring to set two different operating functions simultaneously, for example the temperature on the inner ring wall 40 and a ventilation strength on the outer ring wall 39.

In the case of the operating apparatus 14, a touchscreen 16 having a three-dimensional shape or a three-dimensional body 21 is thus provided as an operating knob 18 whose shape can correspond to a known mechanical operating element, such as a rotary regulator, a rocker arm or a bezel. The user of this operating element in the shape of the operating knob 18 can hereby also find and operate by touch in the motor vehicle 10 without looking.

The operating knob 18 can also be coupled to a haptics actuator A (see FIG. 1), such that haptic feedback can be provided to the user by way of shaking once operating handling has been identified. The operating knob 18 with the pixel matrix 29 can also be produced from a classical operating element by virtue of it being able to be covered with a 3D display and then being placed onto the touchscreen 16, as is illustrated in FIG. 4 and FIG. 8.

Due to the ability to feel and operate without looking, the driver will be less distracted. By producing it in one piece with the deep-drawn panel 20, short dimensional chains are also obtained, with the result that tolerances can be observed with less technical outlay. By arranging the operating knob 18 in the touchscreen 16, the operating apparatus 14 also has a space-saving design.

Pixel graphics can additionally be presented contiguously and seamlessly from the 3D operating element of the operating knob 18 to the flatter touchscreen 16. In addition, realization by way of the touchscreen 16 is possible in which 3D shapes in the touchscreen 16 can be animated, the operating knob 18 can change color or generally the pixel pattern thereof and the associated function can also be swapped. Fluting that moves in accordance with the sliding movement of the finger on the surface can be presented as the pixel pattern, for example. Due to the adaptability of the pixel pattern on the side wall, the operating knob 18 can also be optically adapted to the active operating function. An air-conditioning rotary regulator can be given a different appearance than a radio rotary regulator.

If the pixel matrix 29 and the touch matrix 28 are arranged directly on the panel 20 of the touchscreen 16, the operating knob 18 can be embodied directly as a one-piece protrusion 30 on the panel 20, as is illustrated in FIG. 3. This produces a 3D touch display. As an alternative, it is possible, as illustrated in FIG. 4, for a flat or curved main display 16 or a main screen to be provided with a separate operating knob 18 as an operating element, wherein this operating knob 18 is then covered or embodied with a dedicated pixel matrix 29. If only a shapeable panel 20 is available, as shown in FIG. 5, a flat or curved main display 16 provided with a 3D glass and touch sheet can be provided. The intermediate space (cavity) 44 up to the pixel matrix 29 can be filled with optical fibers 33 to optically couple the luminous pixels 29' from the flat pixel matrix 29 to the surface of the operating knob so as to form the luminous outputs 32.

Figure 11:
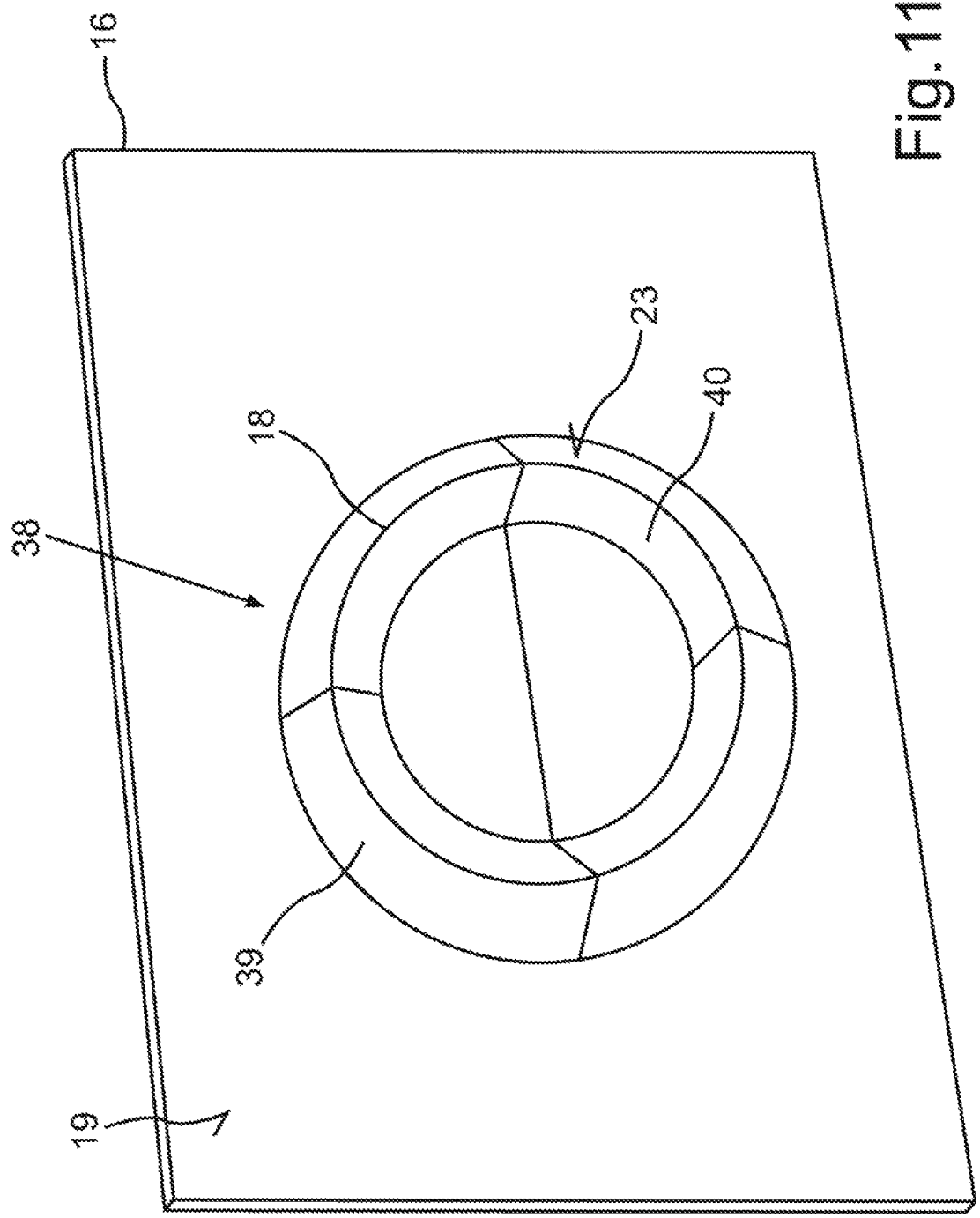
FIG. 11 is a schematic illustration of a perspective view of an operating knob that is embodied in the form of a ring.
Figure 12:
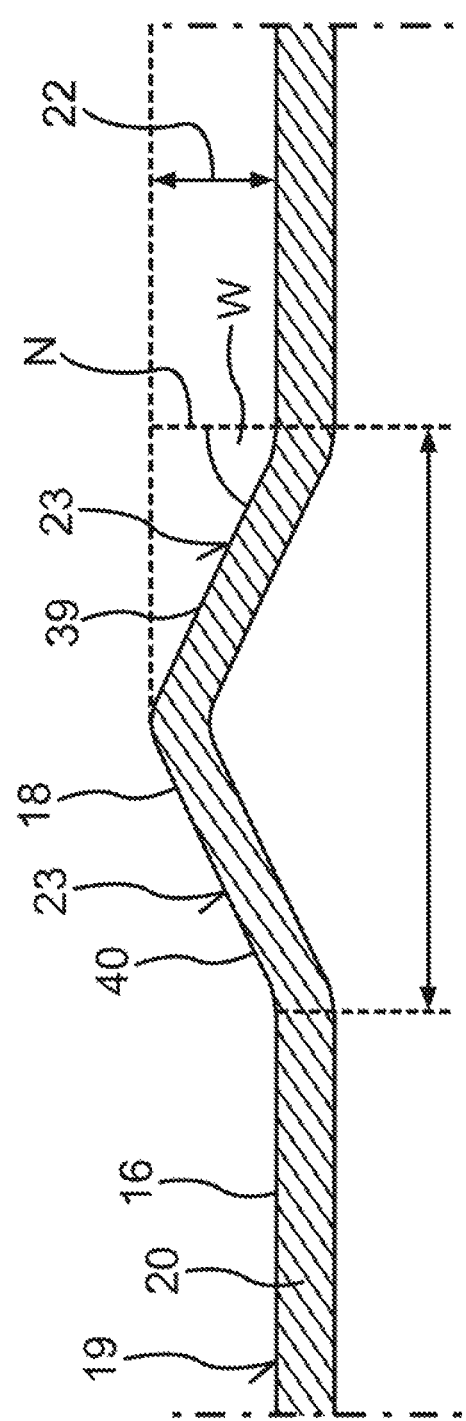
FIG. 12 is a schematic illustration of a sectional view of the ring of FIG. 11.

FIG. 11 shows an operating knob 18, which can be embodied as a flat ring 38 for example on a touchscreen. FIG. 12 in this respect shows that the knob height 22, in relation to the ring width, can be such that the angle W can lie in the range from 0° to 70° and the knob height 22 in the range from 2 mm to 5 mm.

Figure 13:
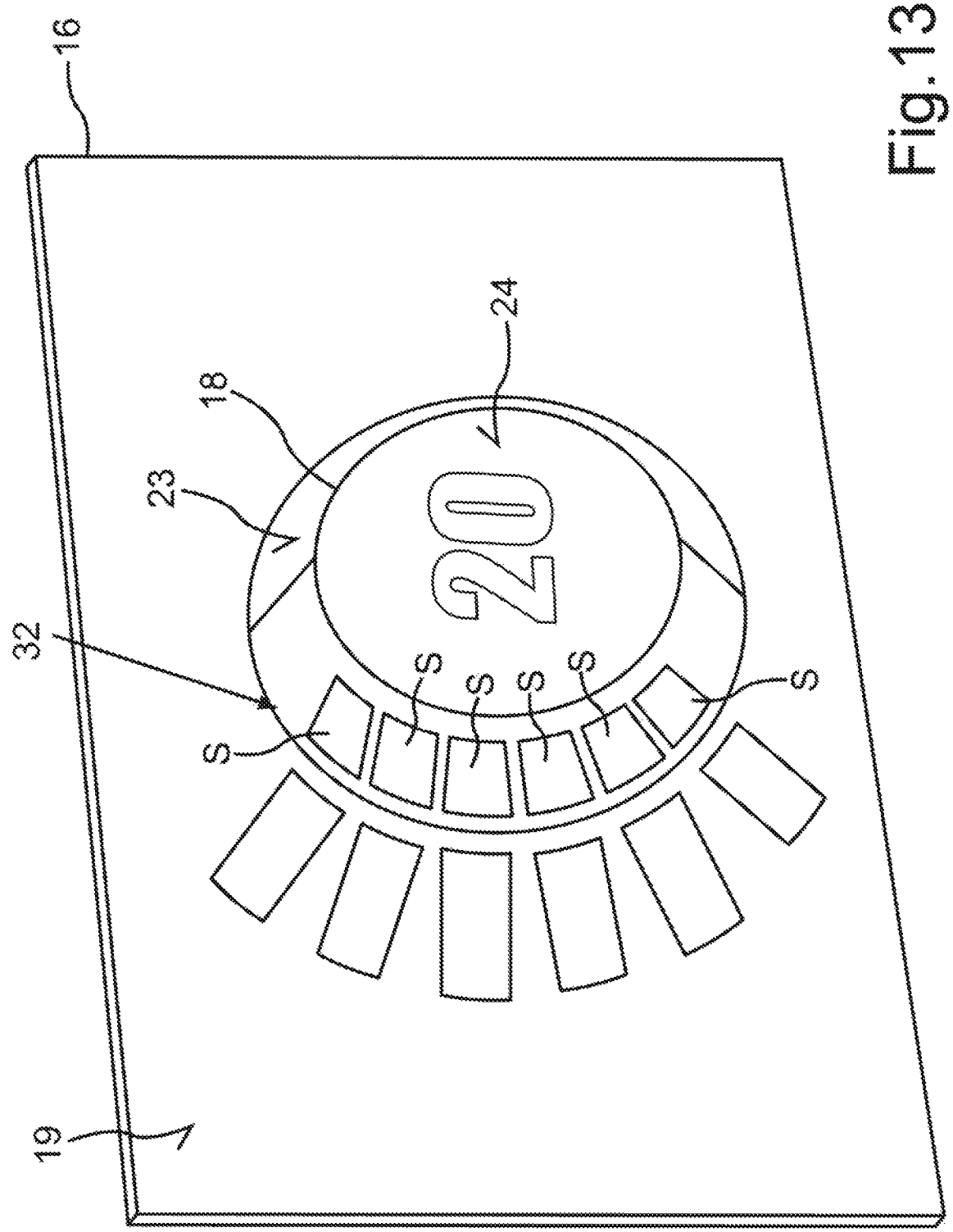
FIG. 13 is a schematic illustration of a perspective view of an operating knob with luminous segments.

FIG. 13 illustrates how, instead of a pixel matrix, luminous segments S can be provided on the side wall 23. FIG. 14 in this respect illustrates how the luminous segments S can be provided on keys 35 of a key bar 34. By switching individual luminous segments S on and off, it is possible for example to illustrate a switch state of the device, as is illustrated in one of the keys 35 of FIG. 14 by way of two switched-on luminous segments S and one switched-off luminous segment S'.

Overall, the examples show how a touch display with integrated 3D operating shapes can be provided.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. An operating apparatus, comprising:
  a pixel-based screen having an outer surface including a glass panel; and
  an operating knob which extends away from a reference plane that corresponds to the outer surface of the pixel-based screen which surrounds the operating knob and which delimits a rear side of the operating knob, the operating knob including:
   a three-dimensional body which protrudes in relation to the reference plane, the body including the glass panel and protruding from the reference plane up to a knob height, at least one side wall which includes the glass panel and extends between the reference plane and the knob height at an angle greater than 20° with respect to the reference plane as a placement surface for at least one finger to operate the operating knob, the knob height being greater than 0.5 cm, and luminous outputs including at least one luminous segment curved into the body and provided on the at least one side wall, or a pixel matrix curved into the body and provided on the at least one side wall.

2. The operating apparatus according to claim 1, wherein the pixel matrix is configured to present pixel patterns specifiable by way of pixel data on the at least one side wall.

3. The operating apparatus according to claim 1, wherein the operating knob includes a frontal display surface which is provided on a front side of the operating knob and offset with respect to the reference plane by the knob height, and the frontal display surface includes further luminous outputs of at least one further luminous segment or the frontal display surface includes the pixel matrix which is provided parallel to the reference plane.

4. The operating apparatus according to claim 1, wherein the at least one side wall includes at least one of a touch-sensitive or proximity sensitive surface to capture an input of the at least one finger, and the input includes at least one of a rotary movement, sliding movement, or push movement of the at least one finger, and the operating apparatus further comprises a controller configured to:
  capture on the at least one side wall the input of the at least one finger,
  determine, when the input includes the sliding movement, a distance value of the sliding movement of the at least one finger with respect to the at least one side wall, and
  determine, when the input includes the rotary movement, a distance value of the rotary movement of the at least one finger with respect to the at least one side wall.

5. The operating apparatus according to claim 4, wherein the operating knob is in a form of a key bar and at least one of the touch-sensitive or proximity-sensitive surface is divided into a plurality of keys.

6. The operating apparatus according to claim 4, wherein the operating knob is in a form of a ring and the at least one side wall has an externally located portion on an outer ring wall of the operating knob and an internally located portion on an inner ring wall of the operating knob.

7. The operating apparatus according to claim 6, wherein the controller is configured to capture the sliding movement in a setting region of the at least one side wall and to capture a further sliding movement in a selection region of the at least one side wall, which differs from the setting region, and to activate, based on the further sliding movement in the selection region, an operating function among a plurality of operating functions and to set, based on a distance value of the sliding movement in the setting region, a setting value for the activated operating function.

8. The operating apparatus according to claim 6, wherein
the externally located portion on the outer ring wall of the operating knob is configured to receive an input which selects an operating function among a plurality of operating functions, and the internally located portion on the inner ring wall of the operating knob is configured to receive an input which selects a setting value of the operating function selected based on the input received by the externally located portion on the outer ring wall of the operating knob.

9. The operating apparatus according to claim 8, wherein the plurality of operating functions include at least one of an air conditioning operating function, a ventilation operating function, a motorized seat system operating function, or an entertainment system operating function.

10. The operating apparatus according to claim 8, wherein when the externally located portion on the outer ring wall of the operating knob receives the input which selects the operating function, the controller is configured to control the pixel-based screen and the pixel matrix to display a pixel pattern contiguously from the operating knob to the outer surface of the pixel-based screen which surrounds the operating knob so as to represent the operating function selected based on the input received by the externally located portion on the outer ring wall of the operating knob.

11. The operating apparatus according to claim 8, wherein when the internally located portion on the inner ring wall of the operating knob receives the input which selects the setting value of the operating function, the controller is configured to control the pixel-based screen and the pixel matrix to display pixel graphics contiguously from the operating knob to the outer surface of the pixel-based screen which surrounds the operating knob so as to represent the setting value selected based on the input received by the internally located portion on the inner ring wall of the operating knob.

12. The operating apparatus according to claim 4, further comprising:
  a haptics actuator,
  wherein the controller is configured to control, based on at least one captured sliding movement, the haptics actuator to agitate the operating knob.

13. The operating apparatus according to claim 1, further comprising a controller to control the pixel-based screen and the pixel matrix of the operating knob to contiguously display a pixel graphic or pixel pattern from the operating knob to the outer surface of the pixel-based screen which surrounds the operating knob, based on an operation of the operating knob.

14. The operating apparatus according to claim 13, wherein the pixel graphic or the pixel pattern is displayed on at least one of the body, the at least one side wall, or a front side of the operating knob.

* * * * *

UNITED STATES PATENT AND TRADEMARK OFFICE
CERTIFICATE OF CORRECTION

PATENT NO. : 10,696,161 B2
APPLICATION NO. : 16/470066
DATED : June 30, 2020
INVENTOR(S) : Jacques Hélot et al.

Page 1 of 1

It is certified that error appears in the above-identified patent and that said Letters Patent is hereby corrected as shown below:

In the Claims

Column 9, Line 25:
In Claim 4, delete "proximity sensitive" and insert -- proximity-sensitive --, therefor.

Signed and Sealed this
Twenty-fifth Day of August, 2020

Andrei Iancu
*Director of the United States Patent and Trademark Office*